United States Patent
Ito

(12) United States Patent    (10) Patent No.: US 6,870,693 B2
Ito    (45) Date of Patent: Mar. 22, 2005

(54) OPTICAL ELEMENT

(75) Inventor: Takashi Ito, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 10/619,104

(22) Filed: Jul. 14, 2003

(65) Prior Publication Data

US 2004/0042088 A1 Mar. 4, 2004

(30) Foreign Application Priority Data

Aug. 27, 2002 (JP) .................................... 2002-247309

(51) Int. Cl.$^7$ .................................................. G02B 7/02
(52) U.S. Cl. ........................................ 359/819; 359/815
(58) Field of Search ................................ 359/643, 656, 359/796, 804–5, 808, 811–12, 815–6, 822, 818–9, 823, 825–30; 362/455; 353/100

(56) References Cited

U.S. PATENT DOCUMENTS

| | | | |
|---|---|---|---|
| 6,424,473 B1 * | 7/2002 | Nakane et al. ............... | 359/827 |
| 6,462,895 B2 * | 10/2002 | Hunter ......................... | 359/819 |
| 6,502,960 B2 * | 1/2003 | Naoe et al. .................. | 362/259 |
| 6,603,612 B2 * | 8/2003 | Nakano ......................... | 359/819 |
| 2002/0097508 A1 * | 7/2002 | Wada et al. ................. | 359/804 |

FOREIGN PATENT DOCUMENTS

JP     5-39467     2/1993

* cited by examiner

Primary Examiner—Jordan M. Schwartz
Assistant Examiner—Jessica Stultz
(74) Attorney, Agent, or Firm—Jordan and Hamburg LLP

(57) ABSTRACT

The present invention provides an optical element (or plastic molding) comprising an optically functional surface and a flange formed on the outer periphery thereof, and having on the flange outer peripheral surface a fitted portion inscribing on the inner peripheral surface of a lens-barrel and an adhering portion to be adhered to the lens-barrel by the adhesive filled in a concave groove of the lens-barrel, wherein a raised portion is formed on the flange surface inside the flange outer peripheral surface, whereby the adhesion area is enlarged, the adhesive capacity is increased, and a sufficient fitting area is secured, without the possibility of flow of the adhesive to the optically functional surface.

5 Claims, 5 Drawing Sheets

PRIOR ART

PRIOR ART

F I G. 3
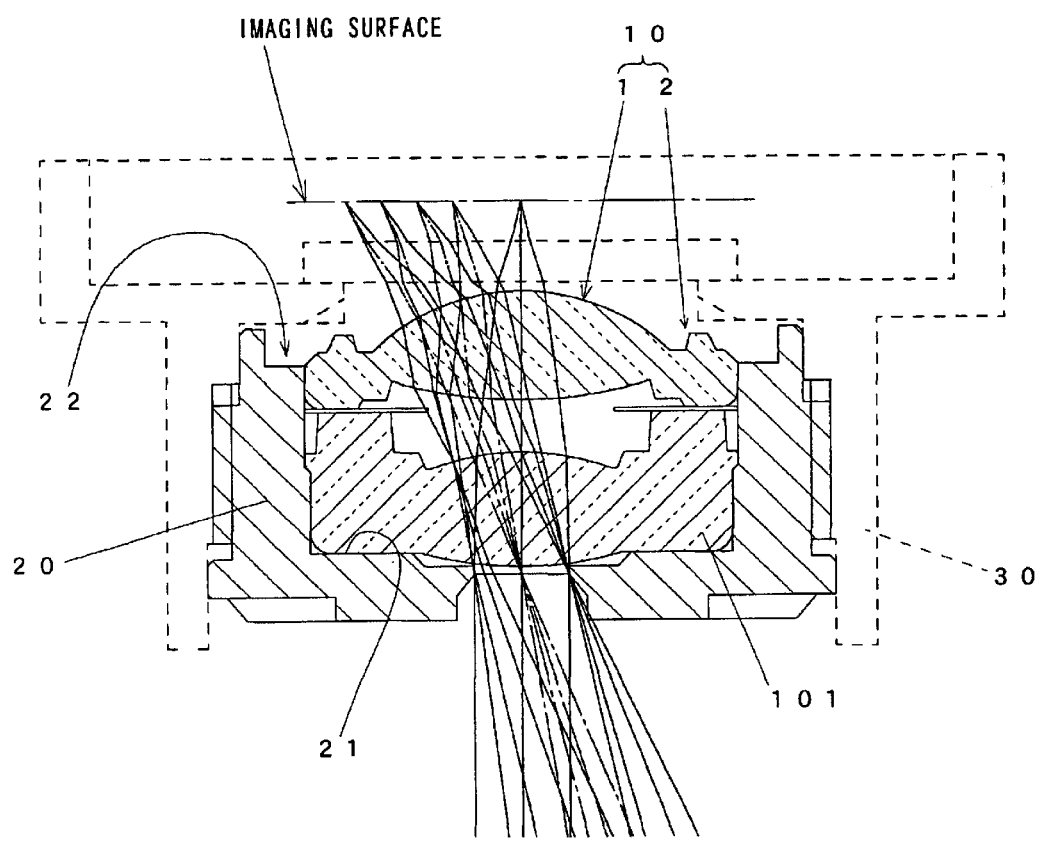

(a)

(b)

OPTICAL ELEMENT

BACKGROUND OF THE INVENTION

1. Field of the Invention

The present invention relates to the structure of an optical element for preventing the outflow of an adhesive to the optically functional surface of the optical element (or plastic molding) when the optical element (or plastic molding) is adhered in a lens-barrel.

2. Description of the Related Art

Conventionally, when an optical element (or plastic molding) is fixed in a lens-barrel using an adhesive, the adhesive was filled in a concave groove (adhesive pool) formed inside the lens-barrel after fitting the optical element (or plastic molding), and the optical element (or plastic molding) was adhered and fixed in the lens-barrel with this adhesive.

The sectional view of FIG. 1 shows a structure when an optical element (or plastic molding) is assembled in a lens-barrel according to a conventional method.

This conventional example assembles two optical elements (or plastic moldings), i.e., a first optical element (or plastic molding) 100 and a second optical element (or plastic molding) 101 in a lens-barrel 20, and an optical element with the lens-barrel having two optical elements (or plastic moldings) 100 and 101 assembled in the lens-barrel 20 is mounted to the mounting holder 30 of mechanical parts to focus light beams on the imaging surface of the mechanical part.

In this conventional example, an optical-element-holding portion 21 is formed on an end of the lens-barrel 20, first the second optical element (or plastic molding) 101 is fitted in the lens-barrel 20, and placed on the optical-element-holding portion 21, then the first optical element (or plastic molding) 100 is placed on the second optical element (or plastic molding) 101. More specifically, the first optical element (or plastic molding) 100 is fitted to the lens-barrel 20 so as to depress the second optical element (or plastic molding) 101, and by adhering the first optical element (or plastic molding) 100 to the lens-barrel 20 using an adhesive A or the like, the first and second optical element (or plastic molding) 100 and 101 are fixed in the lens-barrel 20.

On the other inner periphery of lens-barrel 20, a concave groove (adhesive pool) 22 to fill the adhesive A for adhering the outer peripheral surface of the first optical element (or plastic molding) 100 is formed, and after fitting the outer peripheral surface of the first optical element (or plastic molding) 100 in the lens-barrel, the adhesive A is filled in the concave groove (adhesive pool) 22 to fix the first optical element (or plastic molding) 100 in the lens-barrel 20.

The optical element (or plastic molding) 100 is formed of an optically functional surface 1 and a flange 2' formed on the outer periphery thereof, and the optically functional surface 1 is formed to have a high surface precision. The optical element (or plastic molding) 100 is designed so as to be fixed to the lens-barrel at the flange 2' formed on the outer periphery of the optically functional surface 1, and as FIG. 2(a) shows, a fitting portion to the lens-barrel 20 and an adhering portion to the adhesive A are formed on the outer peripheral surface of the flange (optical element), and the optical element (or plastic molding) is supported at the fitting portion and adhered at the adhering portion.

However, when the first optical element (or plastic molding) 100 is adhered by filling the adhesive A in the concave groove (adhesive pool) 22 formed on the inner periphery of the lens-barrel, as in a conventional method, since width of the concave groove (adhesive pool) formed by cutting the inner periphery of the lens-barrel is limited by the wall thickness of the lens-barrel 20, it is difficult to insert the adhesive-supply nozzle when filling the adhesive, and when a large quantity of the adhesive is filled in the concave groove (adhesive pool) 22 having a small capacity to fill the adhesive (adhesive capacity), the adhesive A flows to the optically functional surface 1 as FIG. 2(b) shows to lower the precision of the optical element, or the adhesive A overflows to interfere with the mechanical part (mounting holder 30).

In other words, in order that the adhesive A does not flow to the flange surface and to the optically functional surface 1, the filling height of the adhesive A must be lower than the flange surface, and therefore, the adhesion area of the adhesive A is small, and the adhesion of the optical element (or plastic molding) 100 is insufficient.

On the other hand, if the concave groove (adhesive pool) 22 formed on the inner peripheral surface of the lens-barrel in order to increase the adhesive capacity and to enlarge the adhesion area, there is the possibility that the fitting area of the optical element (or plastic molding) 100 and the lens-barrel 20 is reduced, and the support of the optical element (or plastic molding) 100 by the lens-barrel 20 becomes unstable.

SUMMARY OF THE INVENTION

Therefore, the object of the present invention is to provide an optical element (or plastic molding) wherein on fixing the optical element (or plastic molding) to the lens-barrel using an adhesive after fitting the optical element (or plastic molding) to the lens-barrel, the adhesion area is enlarged and the adhesive capacity of the adhesive pool is increased, a sufficient fitting area is secured, and the flow of the adhesive to the optically functional surface is prevented.

In order to achieve the above-described object, the optical element (or plastic molding) of the present invention comprises an optically functional surface and a flange formed on the outer periphery thereof, and having on the flange outer peripheral surface a fitted portion fitted to the inner peripheral surface of a lens-barrel that has a concave groove for filling an adhesive formed on a part of the inner peripheral surface, and an adhering portion to be adhered to the lens-barrel by the adhesive filled in the concave groove, wherein a raised portion is formed on the flange surface inside the flange outer peripheral surface to prevent the adhesive filled in the concave groove of the lens-barrel from flowing to the optically functional surface of the optical lens.

BRIEF DESCRIPTION OF THE DRAWINGS

FIG. 3 is a diagram illustrating the fixation of an optical element to a lens-barrel according to an embodiment of the present invention;

DETAILED DESCRIPTION OF THE PREFERRED EMBODIMENTS

Figure 1:
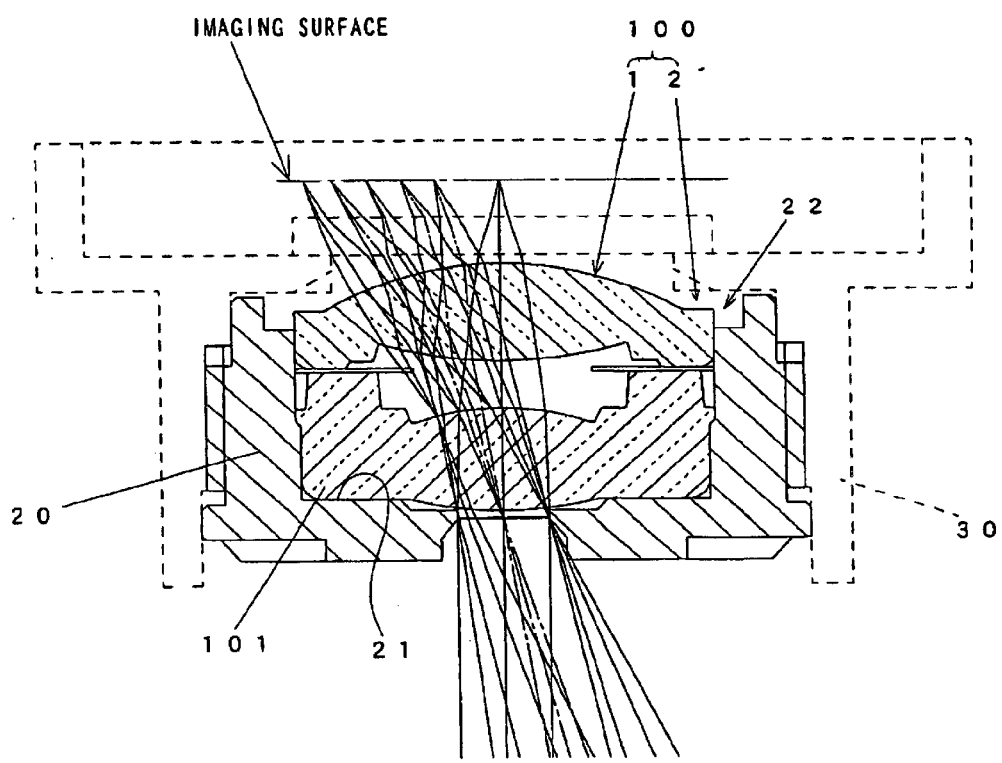
FIG. 1 is a diagram illustrating the fixation of an optical element to a lens-barrel according to a conventional method.
Figure 2A:
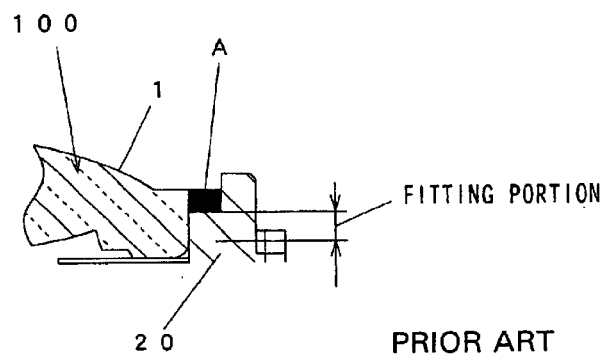
FIG. 2 is an enlarged view of the surrounding of the adhering portion of the optical element shown in FIG. 1.
Figure 2B:
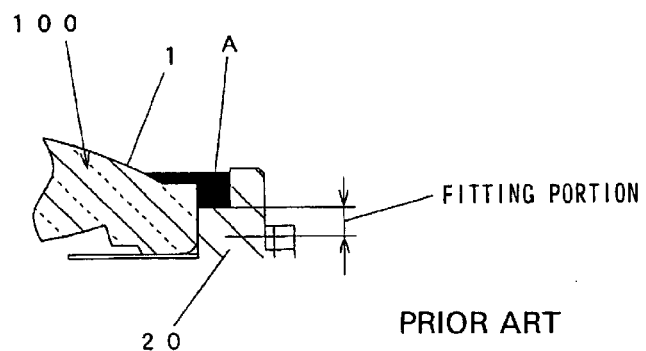

Preferred embodiments of the present invention will be described below referring to the drawings.

Figure 4:
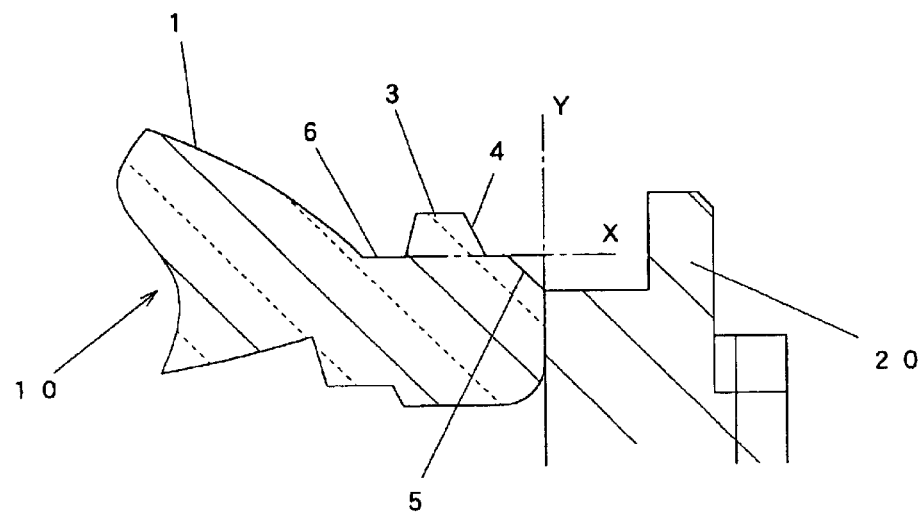
FIG. 4 is an enlarged view of the surrounding of the adhering portion of the optical element shown in FIG. 3.
Figure 4:
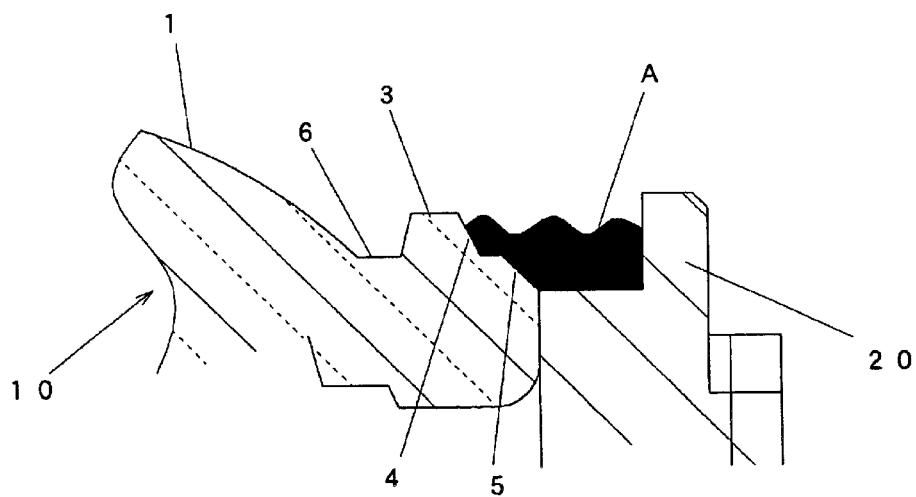

The state wherein an optical element (or plastic molding) according to an embodiment of the present invention is fixed to a lens-barrel is shown in FIGS. 3 and 4.

FIG. 3 shows the state wherein an optical element with a lens-barrel wherein two optical elements, i.e., a first optical element (or plastic molding) 10 and a second optical element (or plastic molding) 101, are assembled in a lens-barrel 20 is mounted on a mounting holder 30 of mechanical parts to focus light beams on the imaging surface of the mechanical part.

An optical-element-holding portion 21 is formed on an end of the lens-barrel 20, the second optical element (or plastic molding) 101 is fitted in the lens-barrel 20 is placed on the optical-element-holding portion 21, then the first optical element (or plastic molding) 10 is placed on the second optical element (or plastic molding) 101. More specifically, the first optical element (or plastic molding) 10 is fitted to the lens-barrel 20 so as to depress the second-optical element (or plastic molding) 101, and by adhering the first optical element (or plastic molding) 10 to the lens-barrel 20 using an adhesive A or the like, the first and second optical element (or plastic molding) 100 and 101 are fixed in the lens-barrel 20.

On the other inner periphery of lens-barrel 20, a concave groove (adhesive pool) 22 to fill the adhesive A for adhering the outer peripheral surface of the first optical element (or plastic molding) 10 to the inner peripheral surface of the lens-barrel 20 is formed, and after fitting the outer peripheral surface of the first optical element (or plastic molding) 10 in the lens-barrel, the adhesive A is filled in the concave groove (adhesive pool) 22 to fix the first optical element (or plastic molding) 10 in the lens-barrel 20.

The optical element (or plastic molding) 10 is formed of an optically functional surface 1 and a flange 2 formed on the outer periphery thereof, and the optically functional surface 1 is formed to have a high surface precision.

FIG. 4 is an enlarged view of the surrounding of the adhering portion of the optical element (or plastic molding) 10.

In FIG. 4(a), the dashed line indicated by X is the extension line of the flange surface, and the dashed line indicated by Y is the extension line of the outer peripheral surface (or fitting portion) of the flange.

As FIG. 4(a) shows, in the optical element (or plastic molding) 10 according to this embodiment, a raised portion 3 is formed on the flange surface, and the raised portion 3 is formed inside the outer peripheral surface of the flange.

The raised portion 3 has a tubular shape so as to surround the optically functional surface 1, and in this embodiment, a first slant face 4 is formed on the outer periphery side of the raised portion 3, and the raised portion 3 is formed to have a taper. In this embodiment, the inner periphery side of the raised portion 3 has also a slant face.

By forming the raised portion 3 on the flange surface inside the outer peripheral surface of the flange so as to surround the optically functional surface 1, the flow of the adhesive A to the optically functional surface 1 is prevented, even if the adhesive A filled in the concave groove (adhesive pool) 22 flows to the flange surface.

In other words, as FIG. 4(b) shows, since the flow of the adhesive A to the optically functional surface 1 can be prevented by the raised portion 3 formed on the flange surface, a large quantity of the adhesive A that exceeds the flange surface can be injected.

By forming the raised portion 3 inside the outer peripheral surface of the flange, the adhesive capacity is increased, and the adhesion effect of the optical element (or plastic molding) by the adhesive A on the flange surface whereto the adhesive A has flowed, that is, the expansion of the adhesion area in the optical element (or plastic molding) can be achieved.

By forming the raised portion 3 inside the outer peripheral surface of the flange, the quantity of the adhesive A that can be filled without flowing to the optically functional surface 1 (adhesive capacity) is increased, and the adhesion area by the adhesive A in the optical element (or plastic molding) can be enlarged.

Also by forming the first slant face 4 on the outer peripheral side of the raised portion 3, and forming the raised portion 3 to have a taper, the injection port (the distance from the apex of the raised portion 3 to the wall of the lens-barrel) when the adhesive A is injected on filling the adhesive is widened, and the nozzle for supplying the adhesive can be easily inserted.

Furthermore, in this embodiment, a second slant face 5 is formed from the upper end of the fitting portion of the outer peripheral surface of the flange toward the flange surface, and the edge of the flange is tapered. Thereby, the adhesive capacity can be increased.

In addition, according to the optical element (or plastic molding) 10 of this embodiment, a space 6 is formed between the raised portion 3 and the optically functional surface 1 so that the adhesive A does not directly flow to the optically functional surface 1 even if a small quantity of the adhesive A overflows from the raised portion 3. Specifically a space 6 is formed so as to surround the optically functional surface 1, and the tubular raised portion 3 is formed on the outer periphery thereof so as to surround the optically functional surface 1.

A concave groove may also be formed in the space 6 so as to surround the optically functional surface 1.

Figure 5:
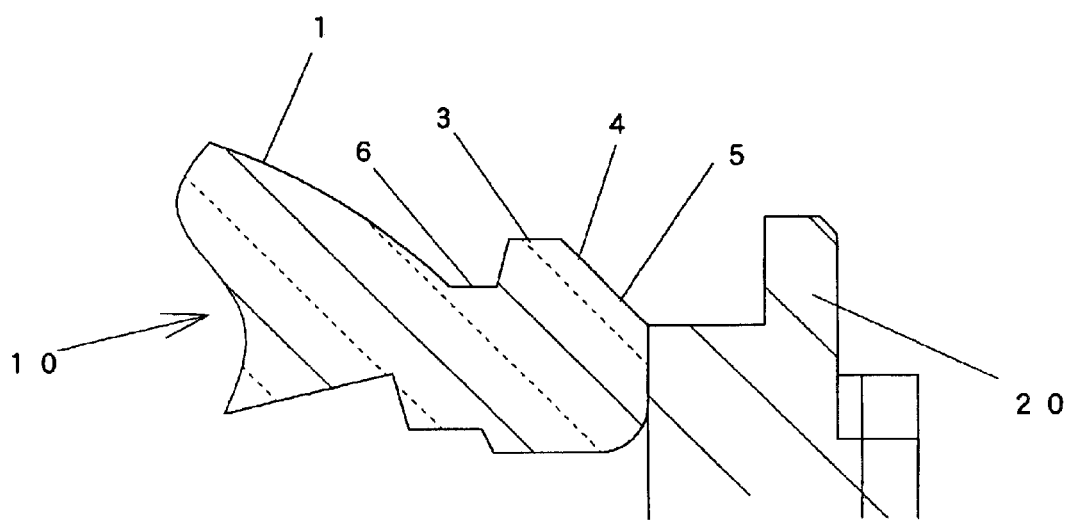
FIG. 5 is a diagram showing another embodiment of the present invention.

FIG. 5 shows another embodiment of the optical element (or plastic molding) 10 according to the present invention.

In this embodiment, the raised portion 3 is formed to have tapers, wherein a first slant face 4 is formed on the outer periphery of the raised portion, a second slant face 5 is formed from the upper end of the fitting portion of the outer peripheral surface of the flange toward the flange surface, and furthermore, the first slant face 4 and the second slant face 5 are formed so as to be on the same plane.

Also in this embodiment, a space 6 is formed between the raised portion 3 and the optically functional surface 1.

As described above, the optical element (or plastic molding) of the present invention comprises an optically functional surface and a flange formed on the outer periphery thereof, and having on the flange outer peripheral surface a fitted portion fitted to the inner peripheral surface of a lens-barrel that has a concave groove for filling an adhesive formed on apart of the inner peripheral surface, and an adhering portion to be adhered to the lens-barrel by the adhesive filled in the concave groove, wherein a raised portion is formed on the flange surface inside the flange outer peripheral surface to enlarge the adhesion area of the flange portion and increase the adhesive capacity of the adhesive pool, to secure the sufficient fitting area, and further to prevent the adhesive from flowing to the optically functional surface.

What is claimed is:

1. An optical element comprising:
   a lens-barrel having an inner peripheral surface and an annular recess formed at an end of said inner peripheral surface having an annular recess inner surface extending axially;

an optically functional surface having a flange formed on the outer periphery thereof;

said flange having an outer peripheral cylindrical surface with a fitted portion fitted to the inner peripheral surface of said lens-barrel below said annular recess;

said flange having an adhering portion to be adhered to the lens-barrel which is an axially extending surface radially opposing said annular recess inner surface;

adhesive filled in said annular recess and on said adhering portion interconnecting said annular recess inner surface and said adhering portion; and said flange having a raised annular portion extending axially and disposed radially inward of said adhering portion to prevent the adhesive from flowing to the optically functional surface.

2. The optical element according to claim 1, wherein:

said raised annular portion has a first slant face on an outer peripheral side of said raised annular portion; and said adhering portion is a second slant face extending from an upper end of said fitted portion.

3. The optical element according to claim 2, wherein the first slant face and the second slant face are on the same plane.

4. The optical element according to claim 1, wherein a space is formed between the raised annular portion and the optically functional surface.

5. The optical element according to claim 2, further comprising an annulus contiguous with and between the first and the second slant surfaces.

* * * * *